United States Patent
Tingelöf

(10) Patent No.: US 10,749,203 B2
(45) Date of Patent: Aug. 18, 2020

(54) FUEL CELL STACK HOUSING

(71) Applicant: POWERCELL SWEDEN AB, Gothenburg (SE)

(72) Inventor: Thomas Tingelöf, Helsinki (SE)

(73) Assignee: POWERCELL SWEDEN AB, Gothenburg (SE)

(*) Notice: Subject to any disclaimer, the term of this patent is extended or adjusted under 35 U.S.C. 154(b) by 86 days.

(21) Appl. No.: 16/062,507

(22) PCT Filed: Dec. 22, 2016

(86) PCT No.: PCT/SE2016/051308
§ 371 (c)(1),
(2) Date: Jun. 14, 2018

(87) PCT Pub. No.: WO2017/131569
PCT Pub. Date: Aug. 3, 2017

(65) Prior Publication Data
US 2018/0375144 A1    Dec. 27, 2018

(30) Foreign Application Priority Data

Jan. 27, 2016 (SE) .................................... 1650092

(51) Int. Cl.
*H01M 8/2475* (2016.01)
*H01M 8/248* (2016.01)
(Continued)

(52) U.S. Cl.
CPC ....... *H01M 8/2475* (2013.01); *H01M 8/0202* (2013.01); *H01M 8/1004* (2013.01); *H01M 8/248* (2013.01); *H01M 2008/1095* (2013.01)

(58) Field of Classification Search
CPC .. H01M 8/2475; H01M 8/0202; H01M 8/248; H01M 8/1004
(Continued)

(56) References Cited

U.S. PATENT DOCUMENTS 8,871,405 B2 * 10/2014 Yamamoto ............ H01M 8/247
429/452
9,406,966 B2 * 8/2016 Hood .................. H01M 8/2475
(Continued)

FOREIGN PATENT DOCUMENTS

| EP | 2395586 A1 | 12/2011 |
|----|------------|---------|
| GB | 2509152 A  | 6/2014  |
| JP | S5975576 A | 4/1984  |

OTHER PUBLICATIONS

International Search Report (dated Apr. 11, 2017) for corresponding International App. PCT/SE2016/051308.
(Continued)

*Primary Examiner* — Amanda C. Walke
(74) *Attorney, Agent, or Firm* — WRB-IP LLP

(57) ABSTRACT

Fuel cell stack housing including at least a bottom section and a first and a second side wall, which are spaced apart by the bottom section, wherein the housing is adapted to house a fuel cell stack and includes at least one fastening element, which is engaged with the first and the second side wall, wherein at least the first side wall of the housing has a flat section and an arched section extending in direction of the second side wall, and wherein a maximum possible distance between the arched section and the bottom portion defines an inner height of the fuel cell stack housing, where in the inner height of the fuel cell stack housing is adjustable, as well as a fuel cell stack assembly including a fuel cell stack encased by such a housing.

12 Claims, 2 Drawing Sheets

(51) Int. Cl.
*H01M 8/0202* (2016.01)
*H01M 8/1004* (2016.01)
*H01M 8/1018* (2016.01)

(58) Field of Classification Search
USPC .......................................................... 429/452
See application file for complete search history.

(56) References Cited

U.S. PATENT DOCUMENTS

| | | | |
|---|---|---|---|
| 9,748,584 B2* | 8/2017 | Hood | H01M 8/2475 |
| 2006/0046127 A1 | 3/2006 | Ishizuka et al. | |
| 2008/0102345 A1 | 5/2008 | Andreas-Schott | |
| 2008/0311457 A1 | 12/2008 | Andreas-Schott | |
| 2010/0086810 A1* | 4/2010 | Hood | H01M 8/04014 |
| | | | 429/439 |
| 2011/0244355 A1 | 10/2011 | Skala | |

OTHER PUBLICATIONS

Indian Official Action (dated Jan. 31, 2020) for corresponding Indian Application 201827028011.

* cited by examiner

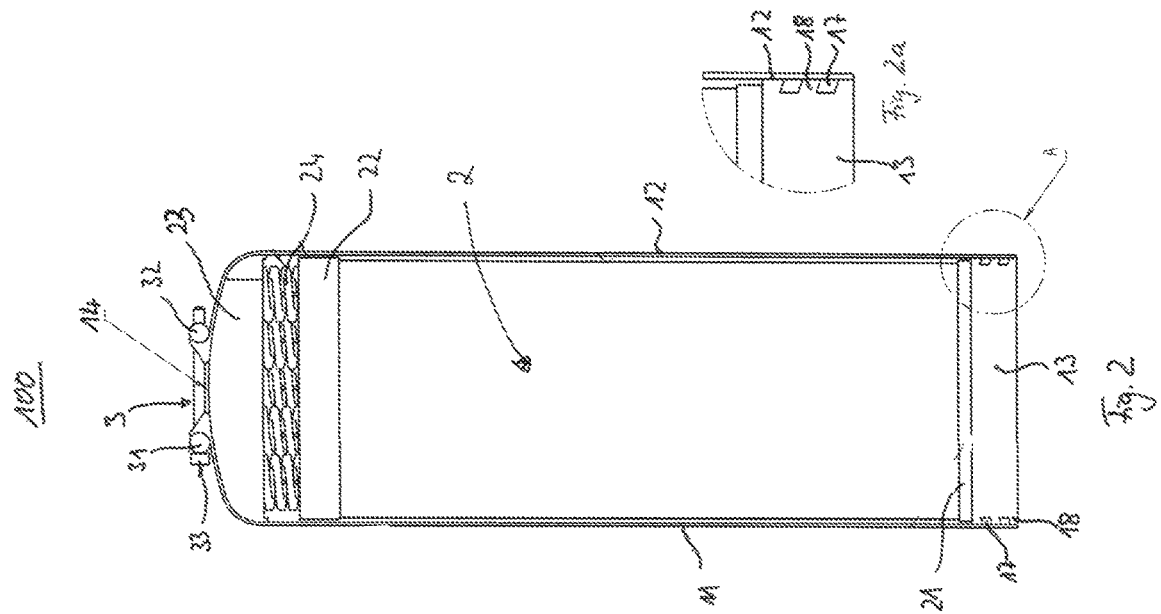
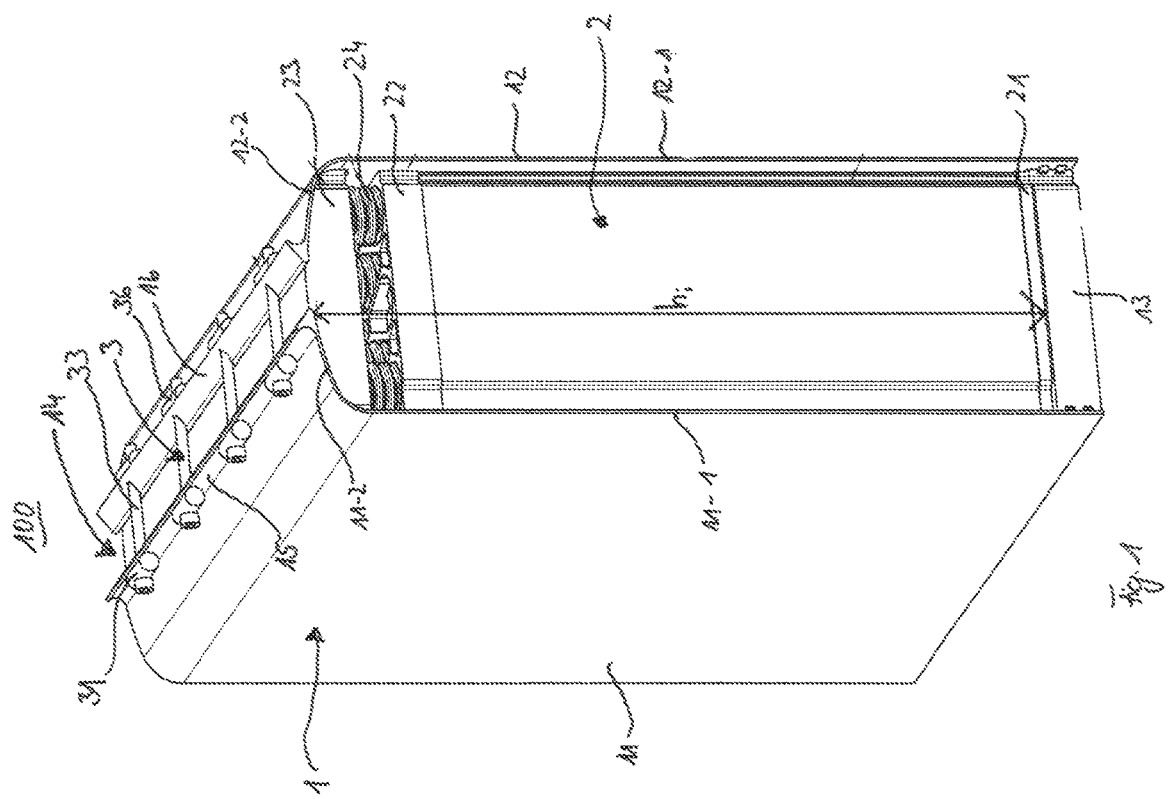

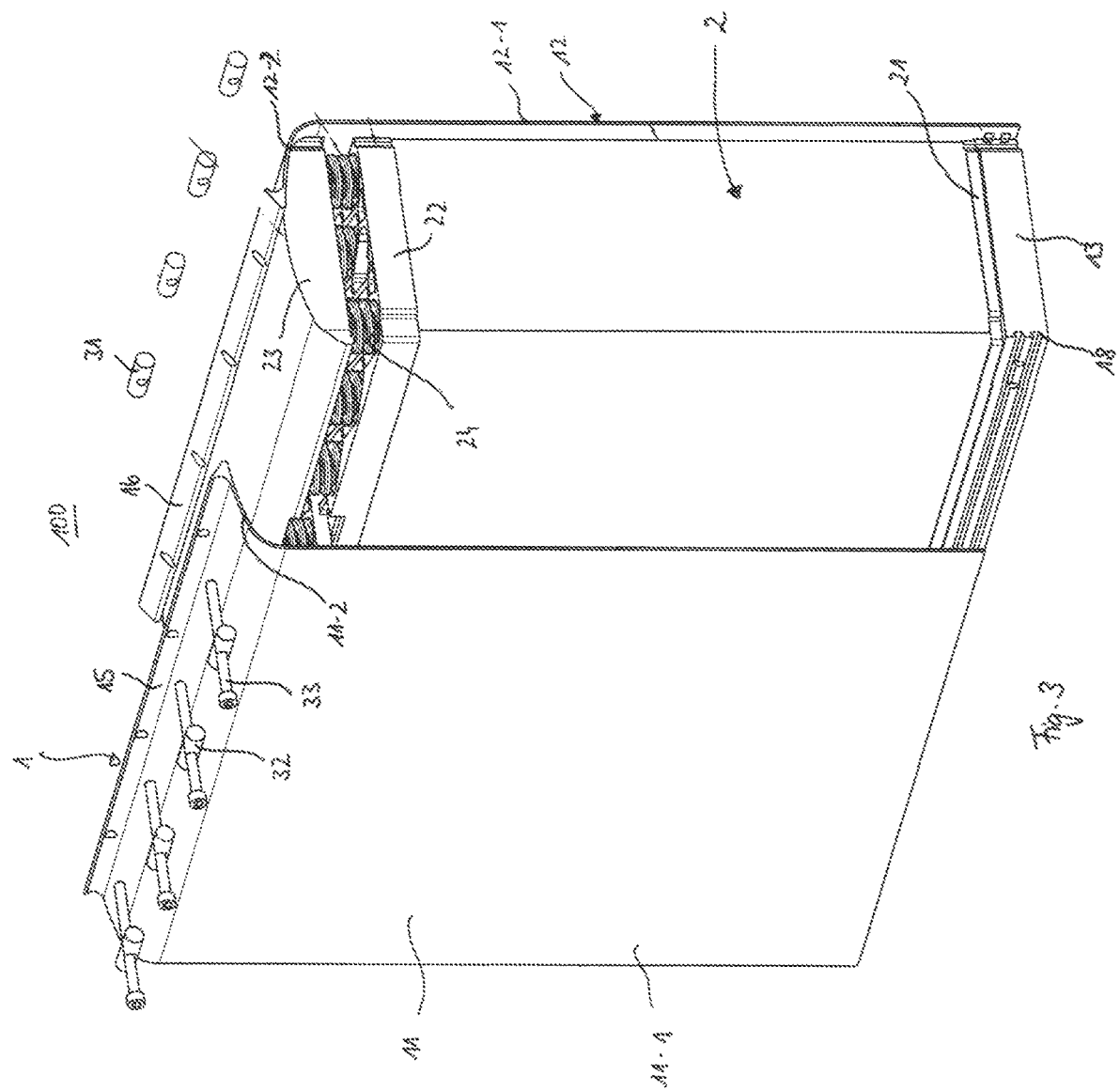

FUEL CELL STACK HOUSING

BACKGROUND AND SUMMARY

The present invention relates to a fuel cell stack housing.

Fuel cells allow a hydrogen-containing fuel gas and an oxygen-containing reactant gas such as air to electrochemically react with each other, so that electric power is produced. The fuel cell is basically structured with a membrane that selectively transports hydrogen ions and is sandwiched between two electrodes, i.e. an anode and a cathode. The assembly of membrane and the electrodes is usually referred to as membrane electrode assembly ("MEA"). A fuel cell stack usually comprises a plurality of stacked membrane electrode assemblies, which are separated by bipolar plates.

The bipolar plates are electrically conductive separators for mechanically clamping the MEA, and for establishing electrical connection in series between adjacent MEAs. Each bipolar plate comprises a plurality of gas flow channels for supplying the corresponding electrode with the fuel gas and the reactant gas, and is further adapted to carry away generated water or excess gas. A structure body in which the MEAs are clamped between the bipolar plates is referred to as the unit fuel cell.

At both ends of the fuel call stack, the bipolar plates are formed as endplates, which clamp the fuel cell stack. For maintaining the stacked configuration and the for preventing leakage between the unit fuel cells, a preferably uniform compression force is applied to the fuel cell stack, which is adapted to press the unit fuel cells together. For maintaining the compression, fasteners such as metal bands or bolts are provided, or the fuel cell stack is accommodated in a housing. Whereas bands and housings encase the fuel cell stack, bolts interact with the endplates and hold the unit fuel cells in place.

The disadvantages of the known assemblies are various. In case the fuel cell stack is fastened by bolts, the endplates are provided with bolt holes and need to provide a sufficient strength for maintaining the compression force. This in turn results in locally varying stresses in the fuel cell stack, which may damage the fuel cell stack. The same applies for the metal bands, which are also unsuitable for providing a homogenous stress in the fuel cell stack.

For avoiding the negative aspects of the bolt holes or metal bands, it has also been proposed, to use housings which accommodate the fuel cell stack as such. However this approach leads to another problem, as the proposed housings are one-size only. The fuel cells stack, however differs in its size due to the stacked configuration of unit fuel cells. Therefore, also the stress applied to the fuel cell stack in the one-size housing varies. This may even result in situations, in which the fuel cell stack suffers from leakage (insufficient stress or in which the fuel cell stack is damaged (excessive stress).

It is desirable to provide a housing for accommodating a fuel cell stack, which provides a uniformly distributed stress in the fuel cells stack, without damaging parts of the fuel cell stack.

In the following a fuel cell stack housing comprising at least a bottom section and a first and a second side wall, which are spaced apart by the bottom section, is disclosed. The housing is further adapted to encase a fuel cell stack and comprises at least one fastening element, which is engaged with the first and the second side wall. Further at least the first side wall of the housing has a flat section and an arched section, wherein the arched section extends in direction of the second side wall. Thereby, a maximum possible distance between the arched section and the bottom section defines an inner height of the fuel cell stack housing. For providing an accommodation of the fuel cell stack which maintains a uniform applicable compression of the fuel cell stack, even if the overall size of the fuel cells varies due to its composition from the plurality of unit fuel cells, the inner height is adjustable. The height adjustment allows for an accommodation of the fuel cells, which may be adapted to the varying dimensions of the fuel cell stack. Thereby, the fuel cell stack may be accommodated in the housing without damage due to an increased stress or without deterioration of the sealing between the unit fuel cells due to insufficient stress.

Preferably, the height adjustment is induced by a tightening level of the at least one fastening element. Thereby, the housing may be pre-manufactured as standard housing which may be adapted to the individual fuel cell stack. An individual manufacturing of the housing after having determined the required height is not necessary.

According to a further preferred embodiment, the tightening level is continuously or stepwise adjustable. This allows for a very precise adjustment to the different height requirements of the fuel cell stack, which in turn provides an optimized accommodation with optimal compression force maintenance. Hence, for example, the fastening element may have a first fastening level which provides a minimal inner height and at least a second fastening level, which provides an intermediate inner height, wherein the intermediate inner height is between the minimal inner height and the inner height in an unfastened condition.

It is further preferred if the first side wall and the second side wall have flat side sections and arched sections, wherein the arched sections extend in direction of each other but are separated from each other by a gap. It should be noted that the gap is also present if only one of the side walls has an arched section. Further, it is preferred that the at least one fastening element spans the gap between the arched sections or the arched section and the side wall, respectively. Consequently, the disclosed height adjustment may be achieved by increasing or decreasing the size of the gap between the arched sections of the housing, which may be achieved by tightening the fastening element to a greater or lesser extent.

According to a further preferred embodiment, the side walls, particularly the arched sections of the side walls, provide flange elements protruding from the housing onto which the fastening elements are attached. This allows for a convenient application of fastening elements, as for example screws or bolts to the arched section of the housing.

According to a further preferred embodiment, the flat side section and the arched section of at least one side wall are integrally formed or are permanently joined together. Thereby, the overall number of elements for the housing may be reduced, which in turn may accelerate the assembling process of the housing itself.

According to a further preferred embodiment, the bottom section is detachably coupled to the side walls. This facilitates the accommodation process of the fuel cell stack into the housing since the side walls and the fastening elements may be pre-assembled. Subsequently, the housing is loaded with the fuel cell stack in a preassembled condition and is then accomplished with the bottom section.

Preferably, the bottom section and the side walls have interlocking elements, engaging each other and fixing the bottom section to the side walls. This allows for a swift assembling process of the bottom section to the side walls.

A further aspect of the present invention relates to a fuel cell stack assembly comprising a fuel cell stack accommodated in a fuel cell stack housing as defined above. Further, the fuel cell stack comprises a first endplate and a second endplate between which a plurality of unit fuel cells is arranged. Thereby, it is preferred if the first endplate is arranged in parallel to the bottom section of the housing, and the second endplate is arrange in vicinity of the arched section/s of the side walls. It should be noted that even if the bottom section and the arched section are named as bottom and top section, the housing with the fuel cell stack may also be arranged sideways, so that the bottom and top section would be presented as sides of the fuel cell stack assembly.

It is further preferable to provide pressing plate, which is arranged between the second endplate and the at least one arched section of the side wall. Thereby, the pressure applied to the fuel cell stack is uniformly distributed to the endplate and to the unit fuel cells.

According to a further preferred embodiment, a resilient element, preferably at least one spring, is arranged between the pressing plate and the second endplate of the fuel cell stack. Also, the resilient element compensates stress inequalities.

Further a shape of the pressing plate may resemble a shape of the arched section of the side wall, which also increases the homogeneity of the stress distribution to the fuel cell stack.

Further advantages and preferred embodiments are disclosed in the claims, the description and the figures. It should be further noted that a person skilled in the an may combine the presented features otherwise than indicated without extending the scope of the invention.

BRIEF DESCRIPTION OF THE DRAWINGS

In the following, the present invention will be described by means of embodiments shown in the figures. The shown embodiments are exemplarily, only, and are not intended to limit the scope of protection. The scope of protection is solely defined by the attached claims.

The figures show:

FIG. 1: a perspective view of a preferred embodiment of a fuel cell stack assembly;

FIG. 2: a front view of the fuel cell stack assembly shown in FIG. 1; and FIG. 3: a perspective view of the fuel cell stack assembly of FIGS. 1 and 2 with partly removed housing.

In the following same a similar functioning elements are indicated with the same reference numerals.

DETAILED DESCRIPTION

FIGS. 1 to 3 show various illustrations of a preferred embodiment of fuel cell stack assembly 100, comprising a housing 1 which encases a fuel cell stack 2. Thereby, FIG. 1 illustrates a perspective view and FIG. 2 a front view of the assembled fuel cell stack assembly 100, whereas FIG. 3 shows the fuel cell stack assembly 100 with a partly removed housing 1.

As illustrated in FIGS. 1 to 3, the fuel cell stack housing 1 has a first side wall 11 and a second side wall 12, which are separated by a bottom section 13 which is designed as bottom plate. The first and second side walls 11, 12 each comprises a flat section 11-1, 12-1 and an arched section 11-2, 12-2, which are, in the illustrated embodiment, integrally formed. As can be further seen, the arched sections 11-2, 12-2 extent in direction to each other but remain separated from each other by a gap 14.

This gap 14 is spanned by fastening elements 3 which are illustrated as bolt-nut-systems in the presented embodiment.

For attaching the fastening elements 3 to the arched sections 11-2, 12-2 of the side walls 11, 12, the arched sections 11-2, 12-2 are designed with flanges 15, 16 which extend from the housing 1. The flanges 15, 16 are arranged at the free ends of the arched sections 11-2, 12-2 and extend outwardly from the housing 1.

As mentioned above, the fastening elements 3 are designed as bolt-nut systems with two cylindrically shaped nuts 31, 32 which accommodate a bolt 33. As can be further seen from FIGS. 1 to 3 the flanges 15, 16 are slightly curved for accommodating and securing the cylindrically shaped nuts 31, 32 of the fastening elements 3. Through the cylindrically shaped nuts 31 and 32 bolts 33 are screwed so that the gap 14 may be more or less closed depending on a tightening level of the bolts 33 in the nuts 31, 32.

Depending on the tightening level of the fastening elements 3 an inner height hi which corresponds to the maximum possible distance between the bottom section 13 and the arched top section 11-2, 12-2, may be adjusted. Hence, it is possible to decrease the inner height by tightening the fastening elements 3 and thereby by decreasing the size of the gap 14. This height adjustment provide the possibility to adjust the housing 1 individually to the accommodated fuel cell stack 2, so that a uniform and optimum pressure may be maintained in the fuel cell stack.

As mentioned above, due to the composition of the fuel cell stack from unit fuel cells comprising a membrane electrode assembly (MEA) sandwiched between two bipolar plates, the overall dimensions of the fuel cell stack may vary slightly. These dimensional variations may result therein that the pressure maintained by the fuel cell stack housing is not optimal for the accommodated fuel cell stack. This may even result in situations where the fuel cell stack is damaged due to excessive stress or leaks due to insufficient stress. With the described adjustable housing 1 such imperfections are overcome, as the inner height hi of the housing may be adjusted by tightening the fastening elements 3 to the desired level and thereby adjusting the opening level of the gap 14, which in turn defines the available inner height hi.

As further illustrated in FIGS. 1 to 3, the fuel cell stack 2 is terminated by a first endplate 21 and a second endplate 22. Thereby, the first endplate 21 is arranged in parallel to the bottom section 13 of the fuel cell stack housing 1. The second endplate 22 in turn is arranged in parallel to the arched sections 11-2, 12-2 of the side walls 11, 12 of the fuel cell stack housing 1.

It is further illustrated that between the arched sections 11-2, 12-2 and the second endplate 22 a so called pressure plate 23 and between the pressure plate 23 and the second endplate 22 resilient members in the form of springs 24 are arranged. The pressure plate 23 and the springs 24, respectively, allow for an even distribution of a pressure force to the endplate 22. Thereby, also local stresses in the fuel cell stack 2 can be avoided.

As is depicted in FIG. 2 and the detail of FIG. 2a the bottom section 13 is not integrally formed with the side walls 11, 12 of the fuel cell stack housing 1 but is detachably designed. For detaching the bottom section 13 from the side walls 11, 12 interlocking elements 17, 18 are provided in the side walls 11, 12 and the bottom section 13, respectively. By these interlocking elements 17, 18 the bottom section 13 may be snapped into the side walls 11, 12, or, as illustrated in FIG. 3, the side walls 11, 12 may be slid on the interlocking element 18 of the bottom section 13.

As can be further seen from FIG. 3, the fastening elements 3 may be attached to the side walls 11, 12 after the side walls have been placed in place. As obvious for a person skilled in the art it is also possible to use different fastening elements than the illustrated bolt-nut-systems. The illustrated bolt-nut-systems in turn have the advantage that the cylindrically formed nuts may fit snugly into the curved flanges 15, 16 so that the curved flanges 15, 16 also prevent the bolts and the nuts from detaching.

Advantageously, the presented fuel cell stack housing provides easy tolerance compensation to varying dimensions of fuel cell stacks by the possibility to adjust the inner height of the fuel cell stack housing. This may be achieved by different tightening levels of the fastening elements. Further, the casing has a low weight and the endplates are opposed to low stress. The housing, particularly the side walls may be made from aluminum or another light alloy wherein the integration of attachment points, such as the openings for the fastening elements or the flanges, are easily provided during an extrusion process. The side walls themselves may be integrally formed or may also be designed in a two-part form which are fused together for example by friction stir welding. Moreover, the outer assembly dimensions may be maintained even if the housing is adjusted to a varying length of the fuel cell stack. The provided gap between the arched sections of the fuel cell stack housing has the further advantage that the fuel cell stack can be accommodated into the housing with a compression force still applied by a stack press, wherein the fastening elements are pre-tightened before the compression force is released.

REFERENCE SIGNS 100 fuel cell stack assembly
1 fuel cell stack housing
11, 12 side walls
11-1, 12.1 flat sections of the side walls
11-2, 12-1 arched sections of the side walls
13 bottom section
14 gap
15, 16 flanges
17, 18 interlocking elements
2 fuel cell stack
21 first endplate
22 second endplate
23 pressure plate
24 spring elements
3 fastening elements
31, 32 cylindrically formed nuts
33 bolts

The invention claimed is:

1. Fuel cell stack housing comprising at least a bottom section and a first and a second side wall, which are spaced apart by the bottom section, wherein the housing is adapted to house a fuel cell stack and comprises at least one fastening element, which is engaged with the first and the second side wall, wherein at least the first side wall of the housing has a flat section and an arched section extending in direction of the second side wall, and wherein a maximum possible distance between the arched section and the bottom portion defines an inner height of the fuel cell stack housing,
wherein the arched section and the second side wall are separated from each other by a gap, wherein the at least one fastening element spans the gap between the arched section and the second side wall, and wherein the inner height of the fuel cell stack housing is adjustable and the height adjustment is induced by a tightening level of the at least one fastening element.

2. Fuel cell stack housing according to claim 1, wherein the tightening level is continuously or stepwise adjustable.

3. Fuel cell stack housing according to claim 1, wherein the first side wall and the second side wall have flat side sections and arched sections, wherein the arched sections extend in direction of each other but are separated from each other by the gap.

4. Fuel cell stack housing according to claim 3, wherein the at least one fastening element spans the gap between the arched sections of the side walls.

5. Fuel cell stack housing according to claim 1, wherein the side walls, preferably the arched sections of the side walls, provide flange elements protruding from the housing onto which the fastening elements are attached.

6. Fuel cell stack housing according to claim 1, wherein the flat side section and the arched section of at least one side wall are integrally formed or are permanently joined together.

7. Fuel cell stack housing according to claim 1, wherein the bottom section is detachably coupled to the side walls.

8. Fuel cell stack housing according to claim 1, wherein the bottom section and the side walls have interlocking elements, which engage and fix the bottom section to the side walls.

9. Fuel cell stack assembly comprising a fuel cell stack accommodated in a fuel cell stack housing according to claim 1, wherein the fuel cell stack comprises a first endplate and a second endplate between which a plurality of unit fuel cells is arranged, wherein the first endplate is arranged in parallel to the bottom section of the housing.

10. Fuel cell stack assembly according to claim 9, wherein a pressing plate is provided, which is arranged between the second endplate and the at least one arched section of the side wall.

11. Fuel cell stack assembly according to claim 10, wherein a resilient element is arranged between the pressing plate and the second endplate of the fuel cell stack.

12. Fuel cell stack assembly according to claim 10, wherein a shape of the pressing plate resembles a shape of the arched section of the side walls.

* * * * *